(No Model.) 2 Sheets—Sheet 1.

G. A. GOODSON.
MAGNETIC TOY.

No. 468,338. Patented Feb. 9, 1892.

Witnesses
E. F. Elmore
A. H. Opsahl

Inventor.
George A. Goodson
By his Attorney.
Jas. F. Williamson (No Model.) 2 Sheets—Sheet 2.

G. A. GOODSON.
MAGNETIC TOY.

No. 468,338. Patented Feb. 9, 1892.

Witnesses.
E. F. Elmore
A. H. Opsahl

Inventor.
George A. Goodson
By his Attorney.
Jas. F. Williamson

UNITED STATES PATENT OFFICE.

GEORGE A. GOODSON, OF MINNEAPOLIS, MINNESOTA.

MAGNETIC TOY.

SPECIFICATION forming part of Letters Patent No. 468,338, dated February 9, 1892.

Application filed April 6, 1891. Serial No. 387,740. (No model.)

*To all whom it may concern:*

Be it known that I, GEORGE A. GOODSON, a citizen of the Dominion of Canada, residing at Minneapolis, in the county of Hennepin and State of Minnesota, have invented certain new and useful Improvements in a Magnetic Toy or Game; and I do hereby declare the following to be a full, clear, and exact description of the invention, such as will enable others skilled in the art to which it appertains to make and use the same.

My invention has for its object to provide an amusing and instructive toy or game. To this end as its essential features I employ a magnetic needle and a permanently-magnetized wand with which to influence the same. According to the pole presented within the magnetic field, the needle may be influenced to settle at different and contrary points for a single location of the wand. In conjunction with these two essential features I also employ in my preferred construction a dial or series of dials marked with symbols corresponding with sets of questions and answers and a figure mounted on the needle and provided with a pointer movable over the dial, or the pointer may be employed without the figure or a figure without the dial or pointer. The symbols on the dial are arranged within the magnetic field of the needle, and upon the designation of any particular question-symbol the needle will swing and settle into one of two different positions, according to which pole of the wand is presented, and the figure will designate the symbol of the answer. Two answers are thus obtainable from every question. A chart with series of questions and answers accompany the device, and if answers be double the number of questions the answers may be grouped or classified in some way, so as to render the designation definite in every case. The questions and answers may be of any desired character, with a view either of instruction or amusement. In my preferred construction I arrange the same with a view of amusement, and to add additional attraction, with an element of magic or mystery, I make the figure in the form of a witch and employ playing-card symbols. The double set of answers may then be contrary, ambiguous, or oracle-like, and a wide range of amusement may then be conveniently grouped, according to the suit of the question symbol.

Figure 3:
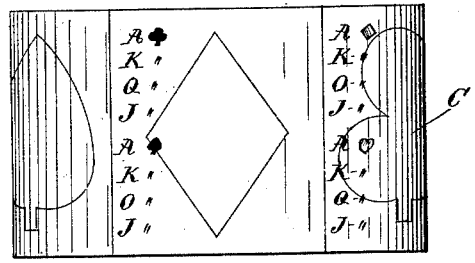
Figure 1:
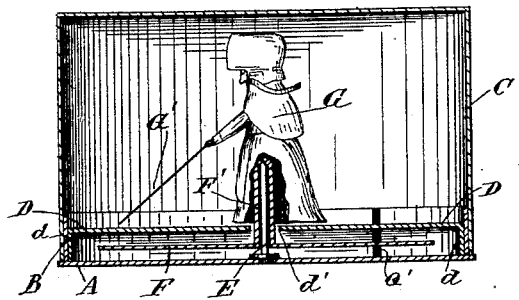
Figure 2:
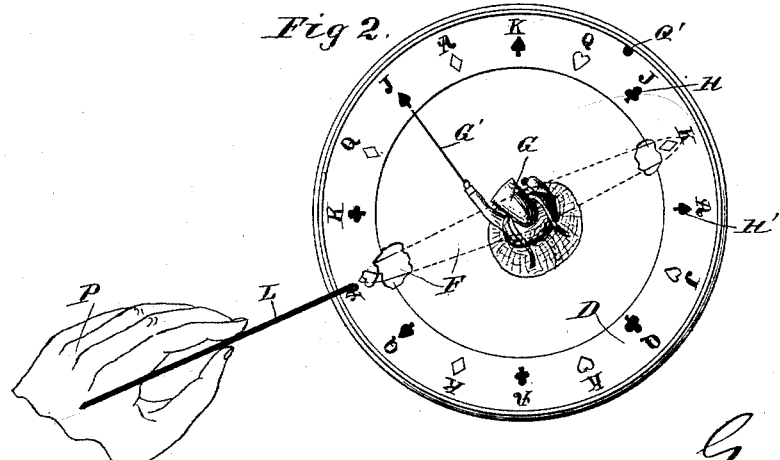
Figure 4:
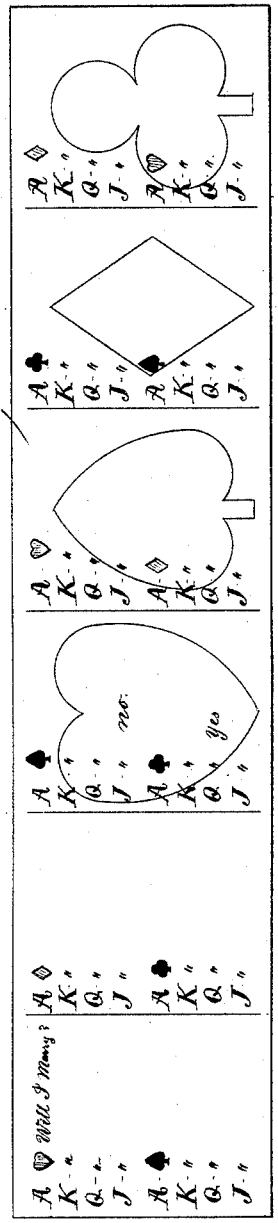
Figure 5:
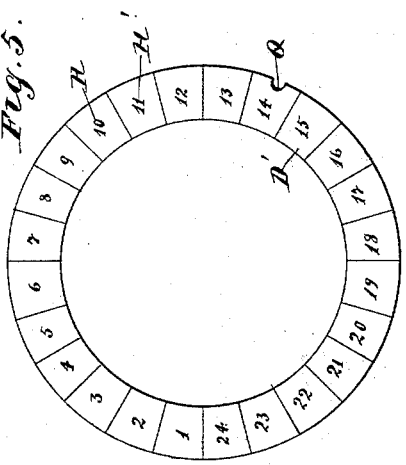

The device is illustrated in the accompanying drawings, wherein, like letters referring to like parts throughout, Figure 1 is a vertical cross-section through the needle-box and its cover, illustrating the construction. Fig. 2 is a plan view of the needle-box detached. Fig. 3 is a side elevation of the cover removed. Fig. 4 is a diagrammatic view illustrating a convenient arrangement of the questions and answers as they may be printed on a part of the box or cover or strip of flexible material adapted to be pasted thereon. Fig. 5 represents a detached dial interchangeable with the dial shown in Fig. 2 or applicable to the needle-box directly over the same, having a different kind of symbols for varying the game or the kind of instruction. There may be any number of such interchangeable dials with corresponding sets of questions and answers.

A B is the needle-box, conveniently formed like the lid part of an ordinary collar-box, and C is a cover for the same, conveniently formed like that of the collar-box body.

D is a dial-plate fitting the needle-box and spaced apart from the bottom thereof in any suitable way, as by the downturned flange $d$ thereon. The dial is perforated at its center, as shown at $d'$.

E is the needle-pivot, projecting from the base of the needle-box through the perforation in the dial-plate and formed conical at its outer end.

F is the magnetic needle, provided with a hollow bearing-post F', fitting over the needle-pivot. The bearing-post F' is also conical at its point of bearing on the needle-pivot. The needle is first placed in position, and the dial is placed over the top of the same, so that the bearing-post projects through the dial and needle is concealed from sight.

G is a figure of some object mounted on the bearing-point of the needle, which, as shown, is intended to represent a witch, and is provided with a pointer G', shown as carried in her hand. The figure is preferably so set on the bearing-post that its pointer will stand at an angle to the needle.

H H', &c., are the symbols on the dial, which, as shown in Figs. 2, 3, and 4, are the well-known "squeezer-marks" of playing cards and in Fig. 5 are ordinary numbers.

K is the question and answer chart, containing questions corresponding to the question-symbols on the dial and two sets of answers, the answers being grouped according to the suit of the question-symbol. For example, if the question-symbol designated be a heart the answer-symbol, whatever it may be, will be in the heart-space, and so for any other suit.

L is a permanently-magnetized wand represented as held in the hand, as shown at P.

The dials are provided with notches, as shown at Q, for sliding over truing-studs Q', fixed to the needle-box, for guiding them and holding them in their proper position.

The method of manipulation or playing the game is obvious. The operator selects his question and points to the corresponding symbol with the wand. The needle will then settle with the pointer over some corresponding answer-symbol and the answer may be read from the chart. If the operator happens to present the positive pole of the wand, an answer of one kind will be indicated, while if he presents the negative pole the pointer will settle over a different answer-symbol with an entirely different and may be contrary answer. Where two or more persons are playing the game, by shifting the wand as it is passed from one to the other widely-divergent answers or fates will be accorded by the witch to different persons asking similar questions. The questions and answers may of course be varied indefinitely and a wide range of amusement be afforded to the players.

In the drawings the question-symbol indicated by the wand is the ace of hearts, corresponding to the question on the chart "Will I marry?" The witch indicates as the answer-symbol the jack of spades. The answer corresponding thereto will be found in the heart-space (as the question-symbol was a heart) opposite the jack of spades. If the other end of the wand had been presented to the same question-symbol, (the ace of hearts,) the witch would have settled with her pointer over the queen of clubs, and the answer, instead of being "no," would have been "yes."

In case the dial D' be substituted a chart with single questions and single answers might accompany the device and be of a character to give instruction. For example, the questions and answers might relate to electricity or some other branch of science. In that event, in order to render the witch's designation definite in every case one end of the wand might be embodied in a wooden handle or fixed in any other way, so that the same pole would always be used to designate the question-symbol.

It should be noted that the magnetic needle in the construction shown is concealed from view. This is to add mystery by obscuring the action or cause of result.

What I claim, and desire to secure by Letters Patent of the United States, is as follows:

1. A magnetic toy comprising a concealed magnetic needle, a dial with symbols corresponding to questions and answers, an exposed pointer carried by the needle, movable over the dial, and a permanently-magnetized wand, substantially as and for the purpose set forth.

2. A game apparatus comprising a magnetic needle, a dial marked with symbols, a series of questions corresponding to said symbols, a double series of answers, two for each question or corresponding symbol on the dial, and a magnetic wand whereby the needle may be made to indicate either one of two different answers to the same question-symbol, according to which pole is presented within the magnetic field of the needle.

3. A game apparatus comprising a magnetic needle, a dial marked with symbols, a series of questions and answers indicated by said symbols, a figure carried by the needle, provided with a pointer movable over said dial, and a magnetic wand whereby upon presentation of the wand to any symbol corresponding to the selected question the figure will point out the symbol indicating the corresponding answer.

4. A game apparatus comprising a magnetic needle, a dial marked with symbols, a series of questions corresponding to said symbols, a double series of answers, two for each question or corresponding symbol on the dial, a figure carried by the needle, provided with a pointer movable over said dial, and a magnetic wand whereby the figure will indicate one of two different answers to the same question-symbol, according to the pole of the wand presented.

5. A toy or game apparatus comprising a magnetic needle, a dial marked with symbols, a figure carried by the needle, provided with a pointer movable over the dial, a magnetic wand, a set of questions corresponding to said symbols, and a double set of corresponding answers, two for each question-symbol, classified in some definite manner to render the designation of the answer definite.

6. A game apparatus comprising a magnetic needle, a dial marked with playing-card symbols, a figure carried by the needle, provided with a pointer movable over said dial, a magnetic wand, a set of questions corresponding to said symbols on the dial, and a double set of answers also corresponding to said symbols, two to each question, classified according to the suit of the question-symbol, substantially as and for the purpose set forth.

7. A mystical-game apparatus comprising a magnetic needle or dial marked with symbols corresponding to questions and answers, a figure of a witch mounted on the needle and carrying in her hand a pointer movable over said dial, the witch being so set on the needle that the pointer will stand at an angle to the needles, and a magnetic wand, substantially as and for the purpose set forth.

8. A mystical-game apparatus comprising a concealed magnetic needle, a dial marked with symbols of playing-cards, an exposed figure of a witch mounted on the needle and carrying in her hand a pointer movable over the dial, the witch being so set on the needle that the pointer will stand at an angle to the needle, a magnetic wand, and a set of questions and double answers corresponding to said symbols, the said answers being classified according to the suit of the question-symbol in order to render the indication definite, substantially as described.

9. In a magnetic toy comprising a magnetic needle, a magnetic wand, a figure carried by the needle and provided with a pointer, and a series of interchangeable dials marked with different symbols corresponding to different sets of questions and answers.

In testimony whereof I affix my signature in presence of two witnesses.

GEORGE A. GOODSON.

Witnesses:
JAS. F. WILLIAMSON,
EMMA F. ELMORE.